US012618369B2

(12) United States Patent
Pankaj et al.

(10) Patent No.: US 12,618,369 B2
(45) Date of Patent: May 5, 2026

(54) PROPULSION ENGINE AND COWL

(71) Applicant: General Electric Company, Schenectady, NY (US)

(72) Inventors: Peeyush Pankaj, Bangalore (IN); Narayanan Payyoor, Bangalore (IN); Richard Schmidt, Loveland, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 154 days.

(21) Appl. No.: 17/463,849

(22) Filed: Sep. 1, 2021

(65) Prior Publication Data

US 2022/0119123 A1 Apr. 21, 2022

(30) Foreign Application Priority Data

Oct. 16, 2020 (IN) .............................. 202011045065

(51) Int. Cl.
*B64D 29/06* (2006.01)
*B64D 27/40* (2024.01)
*F02C 7/20* (2006.01)

(52) U.S. Cl.
CPC ................ *F02C 7/20* (2013.01); *B64D 27/40* (2024.01); *B64D 29/06* (2013.01); *F05D 2240/14* (2013.01)

(58) Field of Classification Search
CPC ... B64D 29/06; F02C 7/20; F02K 1/80; F02K 1/82; F02K 1/822
USPC ........................................................ 248/690
See application file for complete search history.

(56) References Cited

U.S. PATENT DOCUMENTS

| | | | | |
|---|---|---|---|---|
| 2,481,547 | A | * | 9/1949 | Daniel ...................... F02C 7/20 |
| | | | | 60/797 |
| 3,750,983 | A | | 8/1973 | Morris |
| 4,147,029 | A | * | 4/1979 | Sargisson .................. F02K 1/70 |
| | | | | 244/54 |
| 4,471,609 | A | * | 9/1984 | Porter .................... B64D 27/18 |
| | | | | 244/129.4 |
| 4,658,579 | A | | 4/1987 | Bower et al. |
| 4,683,717 | A | | 8/1987 | Naud |
| 4,731,991 | A | | 3/1988 | Newton |
| 8,220,738 | B2 | | 7/2012 | Calder et al. |
| 10,180,105 | B2 | | 1/2019 | Peters |
| 10,436,151 | B2 | | 10/2019 | Miller et al. |
| 11,661,906 | B2 | | 5/2023 | Eckett et al. |

(Continued)

FOREIGN PATENT DOCUMENTS

| | | |
|---|---|---|
| CN | 110182372 A | 8/2019 |
| EP | 0145809 A1 | 6/1985 |
| JP | H05202768 A | 8/1993 |

*Primary Examiner* — Devon C Kramer
*Assistant Examiner* — Marc Amar
(74) *Attorney, Agent, or Firm* — Venable LLP; Duarte Y Ho; Michele V. Frank

(57) ABSTRACT

A propulsion system for an aircraft including a core engine connected to a forward frame and a turbine frame assembly, and an aft frame assembly is connected by a turbine casing to the core engine aft of the turbine frame assembly. A core cowl surrounds the core engine, wherein the core cowl is connected to the forward frame. A plurality of cowl mount links selectively loads the core cowl to the aft frame assembly and the turbine frame assembly, wherein the plurality of cowl mount links is each loaded by deflection of the core engine.

19 Claims, 8 Drawing Sheets

(56) References Cited

U.S. PATENT DOCUMENTS

| | | | | |
|---|---|---|---|---|
| 2005/0086945 A1* | 4/2005 | Tiemann | .................... | F23R 3/60 |
| | | | | 60/800 |
| 2008/0073460 A1* | 3/2008 | Beardsley | ................. | F02C 7/20 |
| | | | | 244/54 |
| 2009/0056343 A1* | 3/2009 | Suciu | ..................... | B64D 27/18 |
| | | | | 60/797 |
| 2012/0093642 A1* | 4/2012 | Nilsson | ..................... | F01D 9/04 |
| | | | | 415/213.1 |
| 2012/0305700 A1* | 12/2012 | Stuart | .................... | B64D 27/18 |
| | | | | 244/54 |
| 2016/0376995 A1* | 12/2016 | Ronan | .................... | F02K 1/822 |
| | | | | 415/215.1 |
| 2017/0191378 A1* | 7/2017 | Moniz | .................... | F04D 29/321 |
| 2017/0292882 A1 | 10/2017 | Wood et al. | | |
| 2018/0118355 A1* | 5/2018 | Pautis | .................... | B64D 27/26 |
| 2018/0320899 A1 | 11/2018 | Karafillis et al. | | |
| 2018/0362170 A1 | 12/2018 | Stuart et al. | | |
| 2019/0093507 A1 | 3/2019 | Ward | | |
| 2019/0093516 A1 | 3/2019 | Wootton et al. | | |
| 2019/0113002 A1* | 4/2019 | Sanz Martinez | ......... | F02K 1/64 |
| 2021/0095577 A1* | 4/2021 | Linde | ..................... | F01D 25/30 |

* cited by examiner

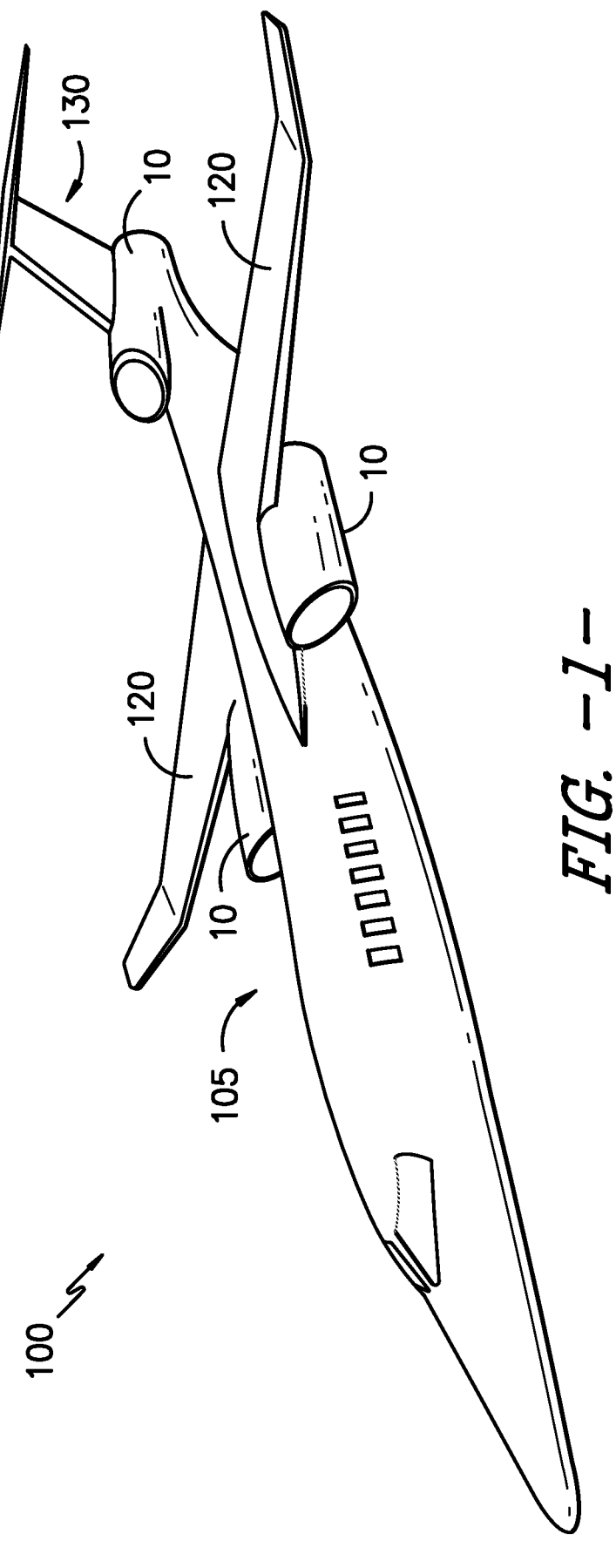
*FIG. —1—*

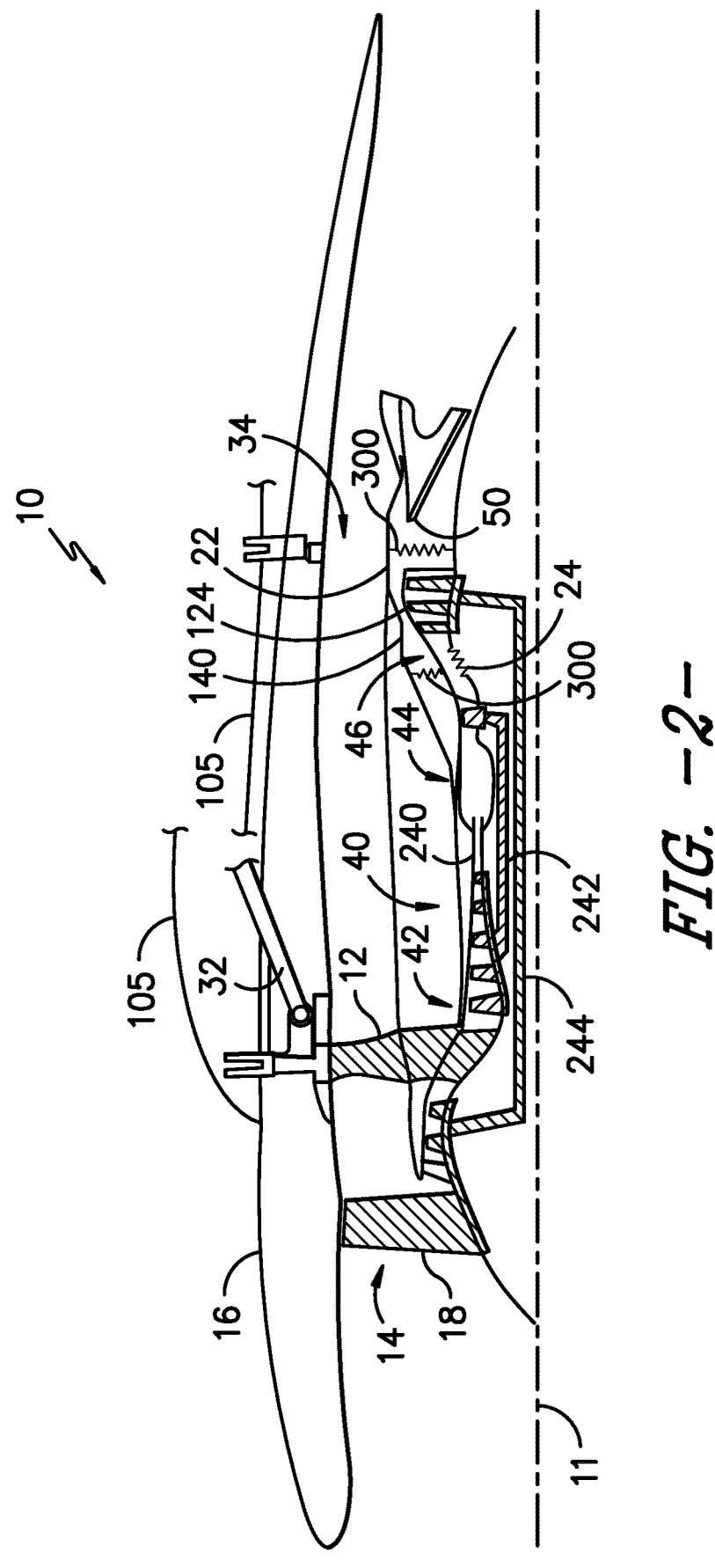
FIG. -2-

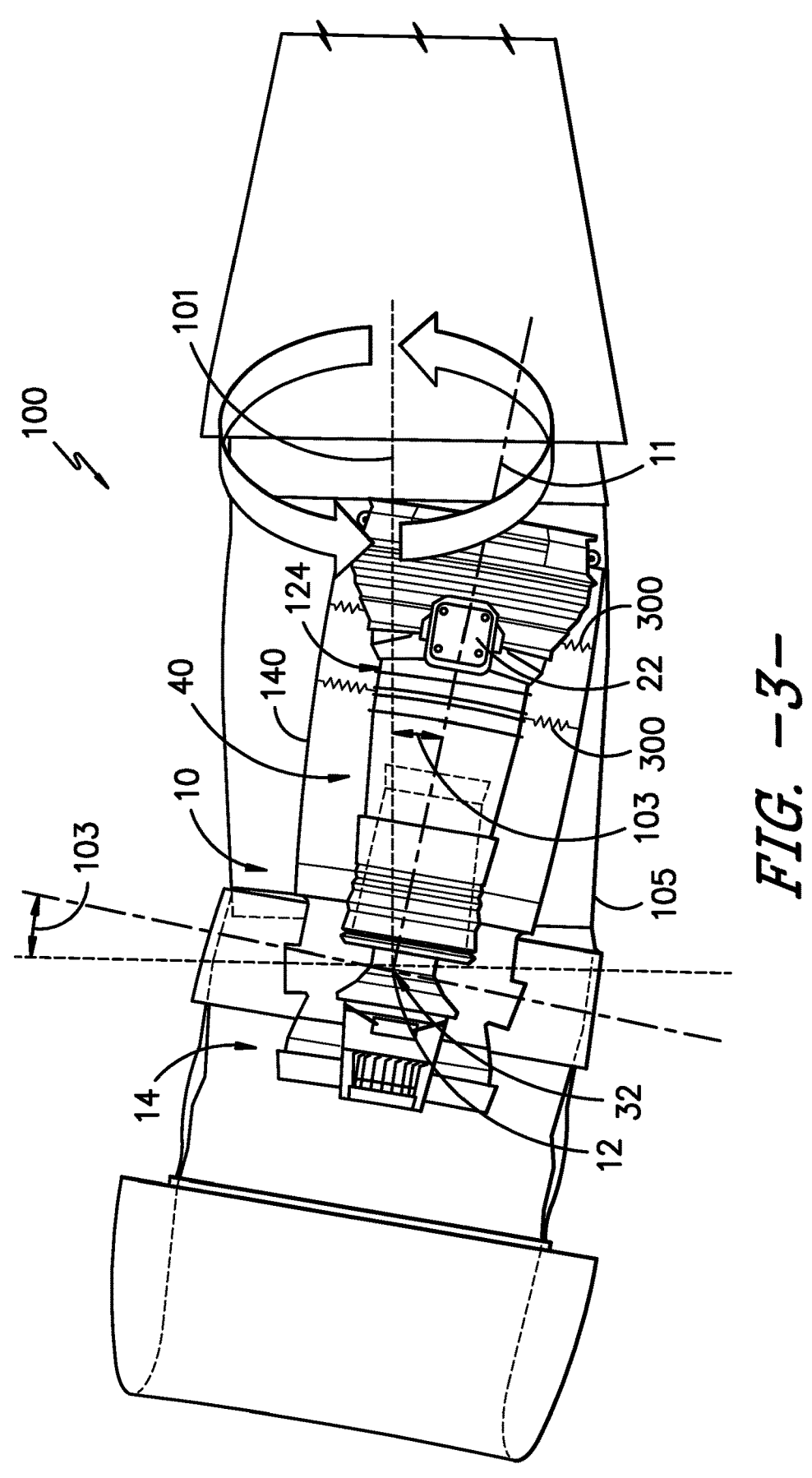
FIG. -3-

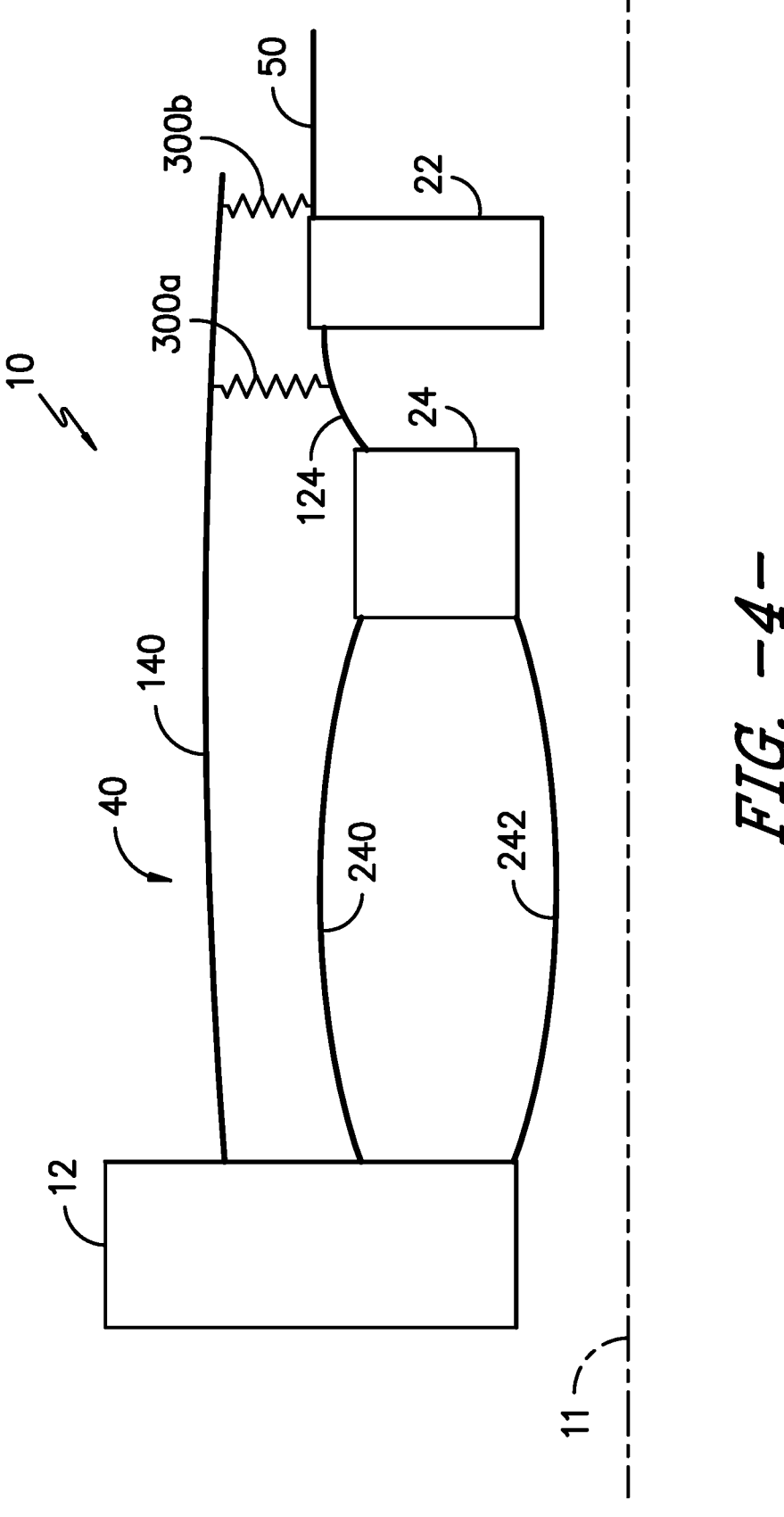
*FIG. -4-*

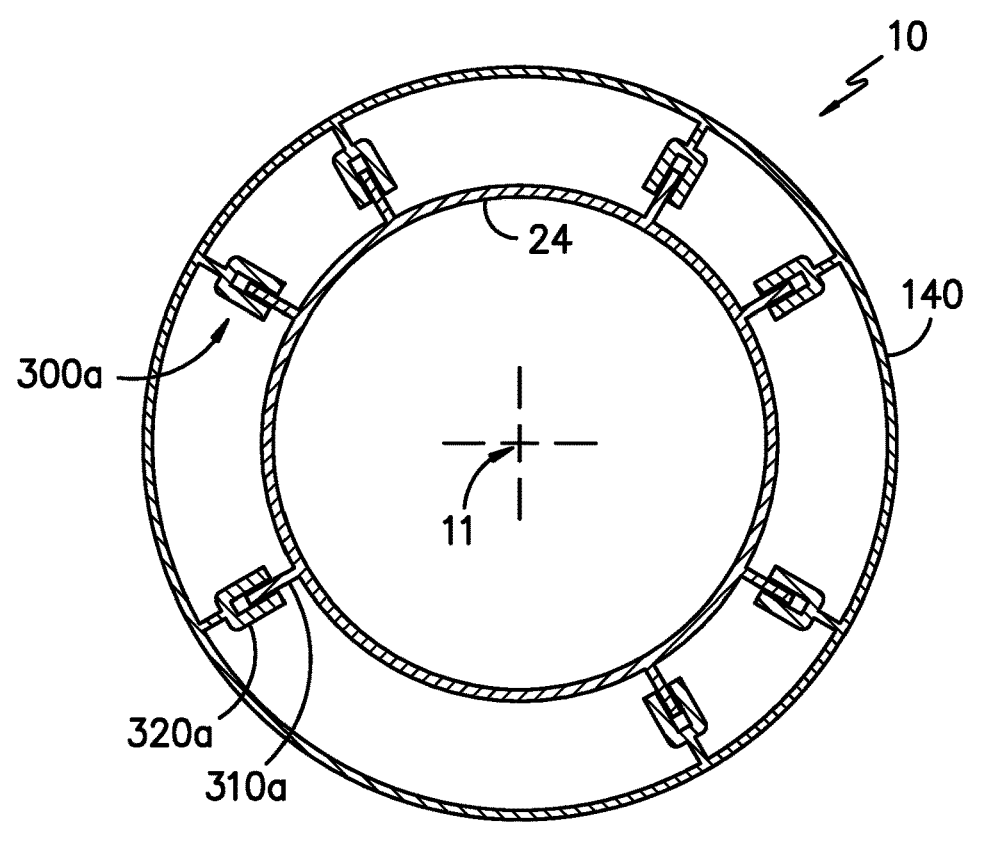
*FIG. -5-*
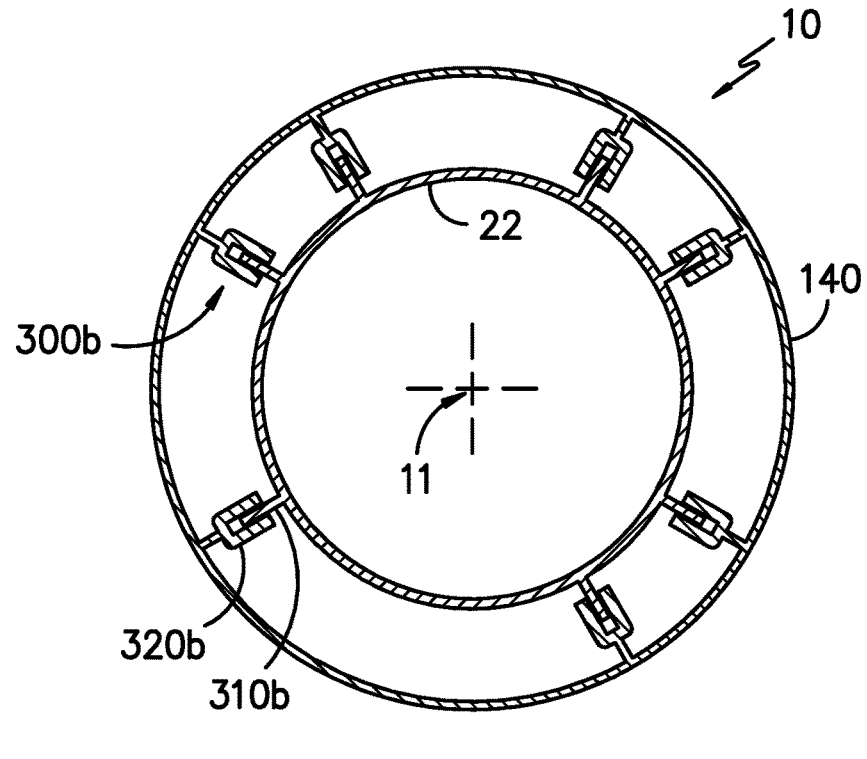
*FIG. -6-*

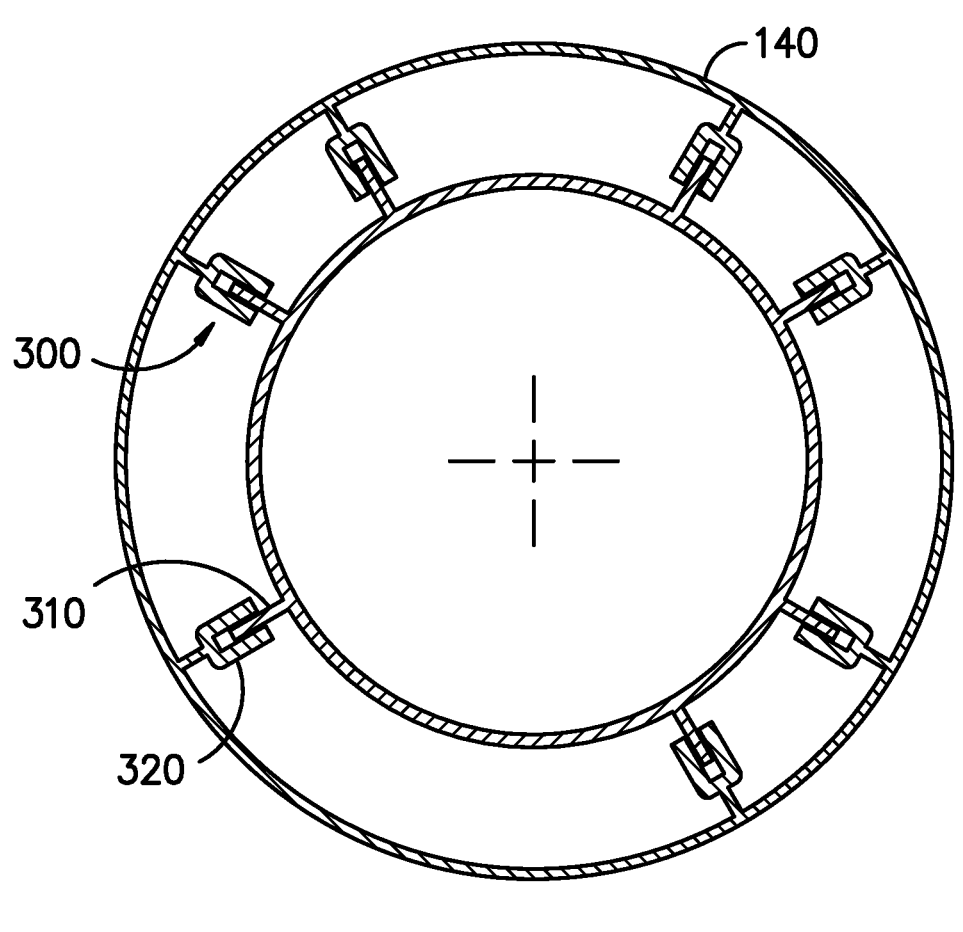
*FIG. -7-*
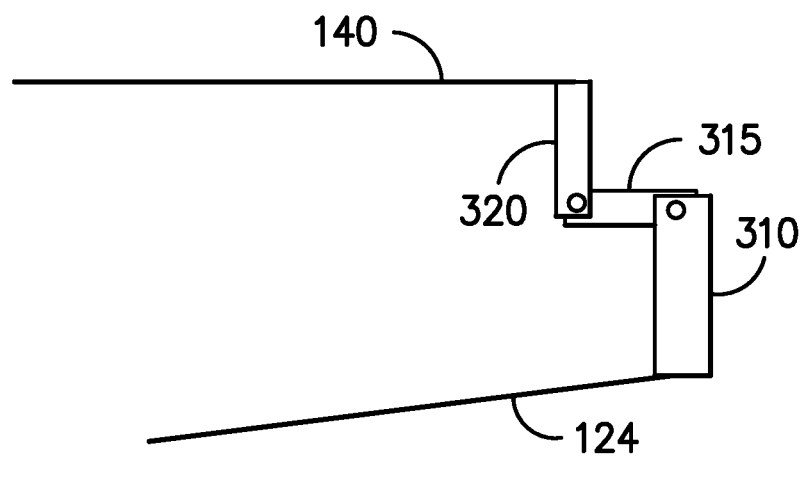
*FIG. -8-*

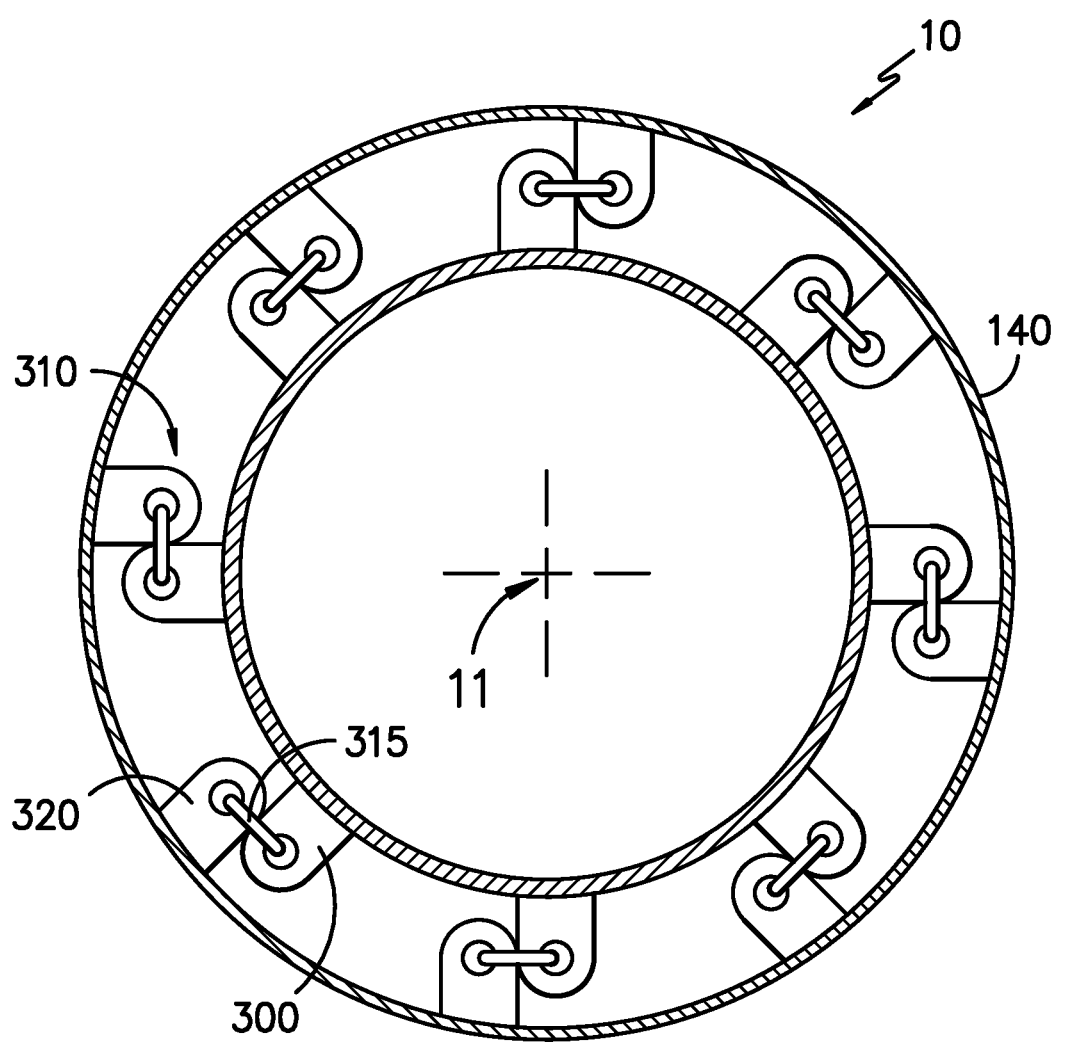
FIG. -9-

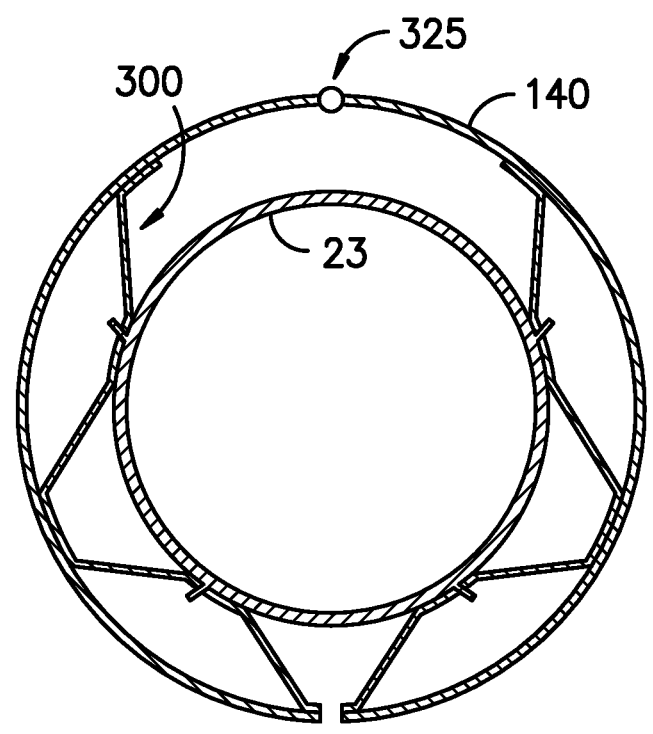
*FIG. -10-*
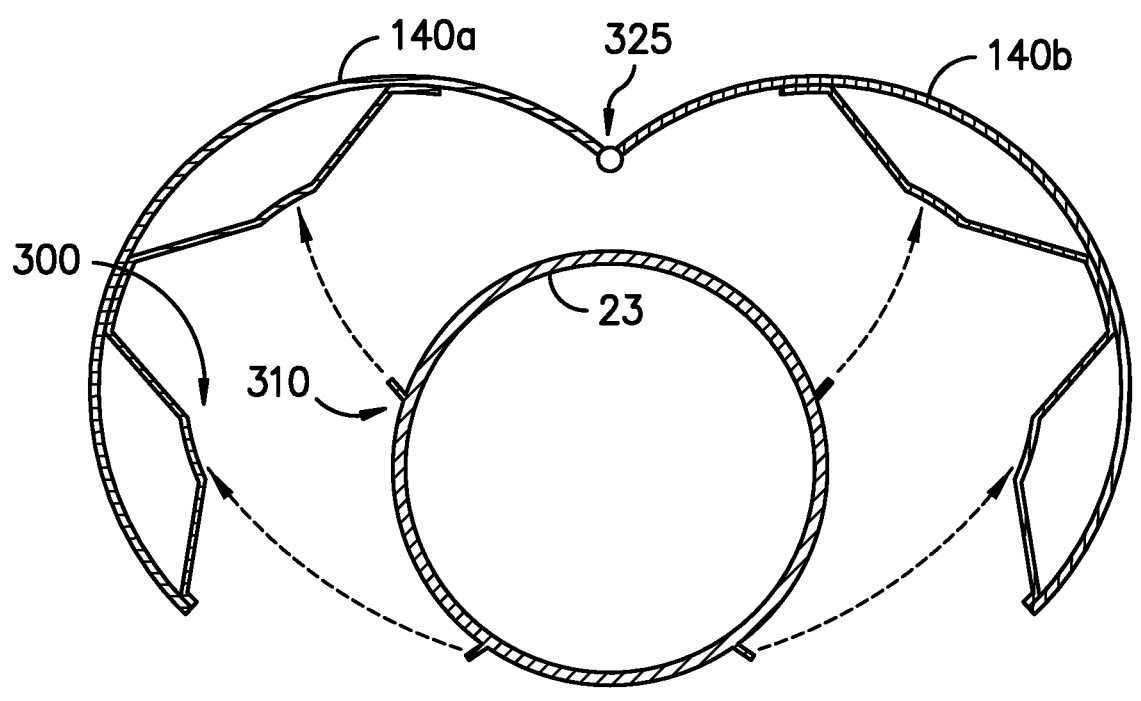
*FIG. -11-*

PROPULSION ENGINE AND COWL

PRIORITY INFORMATION

The present application claims priority to Indian Patent Application Number 202011045065 filed on Oct. 16, 2020.

FIELD

The present subject matter relates generally to propulsion system cowls and mount structures therefor.

BACKGROUND

Propulsion engines, such as turbofan engines, include cowls surrounding a core engine or gas generator of the propulsion engine. Conventional cowl mount structures include linkages at a forward fan and an aft plane of the turbofan engine. Certain cowl mount systems, such as cantilevered cowl mounts, may result in a bending moment that would otherwise distort engine clearances are not transmitted through the core engine.

However, cantilevered cowl mount systems are susceptible to excessive engine deflection following extreme aircraft maneuvers that may result from foreign object ingestion, bird strikes, blade out, or other failure modes. Excessive engine deflection may result in excessive loads at the cowl mount location, such as at the forward mount, flanges, or other attachment points. Excessive loads may manifest as engine oscillations following an extreme engine or aircraft event. However, such additional reinforcements significantly increase engine weight, which adversely impacts engine and aircraft fuel consumption.

Therefore, an improved propulsion engine cowl mount system that provides improved clearance distortion characteristics and mitigates excessive deflection is desired.

BRIEF DESCRIPTION

Aspects and advantages of the invention will be set forth in part in the following description, or may be obvious from the description, or may be learned through practice of the invention.

An aspect of the present disclosure is directed to a propulsion system for an aircraft including a core engine connected to a forward frame and a turbine frame assembly, and an aft frame assembly is connected by a turbine casing to the core engine aft of the turbine frame assembly. A core cowl surrounds the core engine, wherein the core cowl is connected to the forward frame. A plurality of cowl mount links selectively loads the core cowl to the aft frame assembly and the turbine frame assembly, wherein the plurality of cowl mount links is each loaded by deflection of the core engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary aircraft according to an aspect of the present disclosure;

FIG. 2 is a cross sectional view of an exemplary embodiment of a portion of an aircraft including an exemplary embodiment of a propulsion system according to aspects of the present disclosure;

FIG. 3 is a perspective view of an exemplary embodiment of a propulsion system deflecting at the airframe;

FIG. 4 is a schematic view of a propulsion system including cowl mount links according to aspects of the present disclosure;

FIGS. 5-9 depict embodiments of the cowl mount links of the propulsion system of FIGS. 2-4;

FIG. 10 depicts an embodiment of the cowl mount link of the propulsion system of FIGS. 2-4; and FIG. 11 depicts an embodiment of the propulsion system of FIG. 10.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a propulsion system mount system including a cantilevered core configuration with a deflection limiting aft mount structure are depicted and described herein. Embodiments of the propulsion system and aircraft provided herein may allow for benefits associated with cantilevered core configuration. Benefits include mitigating transfer of bending moments and other loads through the aft mount during normal operation, such as to mitigate distortions, asymmetry, and undesired clearances between a rotating structure of the propulsion system and a surrounding static casing of the propulsion system. Furthermore, the aft mount structure depicted and described herein limits excessive deflection, oscillation, wagging, or other movements of the core engine relative to a nominal centerline axis following extreme maneuvers. The aft mount structure provided herein allows for load sharing between the aft mount and the forward mount following extreme maneuvers while remaining cantilevered or generally unloaded at the aft mount during normal operation.

Referring now to the drawings, in FIG. 1, an exemplary embodiment of an aircraft 100 according to an aspect of the present disclosure is provided. The aircraft 100 includes an aircraft structure or airframe 105. The airframe 105 includes a fuselage 110 to which wings 120 and an empennage 130 are attached. A propulsion system 10 according to aspects of the present disclosure is attached to one or more portions of the airframe. In certain instances, the propulsion system 10 is attached to an aft portion of the fuselage 110. In certain other instances, the propulsion system 10 is attached underneath, above, or through the wing 120 and/or portion of the empennage 130.

In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Referring now to FIG. 2, an embodiment of the propulsion system 10 is provided. The propulsion system 10 may generally be configured as a turbo machine, such as a gas turbine engine including a compressor section 42, a heat addition or combustion section 44, and a turbine section 46 in serial flow arrangement. The core engine 40 includes one or more rotor assemblies including one or more shafts coupling respective compressors and turbines. In certain embodiments, the core engine 40 includes a high speed or first shaft 242 operably coupling a high speed compressor 141 and a high speed turbine 146. In still certain embodiments, the propulsion system 10 may include a lower sped or second shaft 244 operably coupling a lower speed compressor 143 and a lower speed turbine 246.

Certain embodiments of the propulsion system 10 are configured as a turbofan or turbojet engine including a fan assembly 14 operatively connected to a core engine 40. The core engine 40 includes a core casing 240 surrounds rotary elements of the core engine 40. In various embodiments, the core casing 240 is extended from a forward frame 12 to a turbine frame assembly 24. In certain embodiments, the core casing 240 includes a plurality of segments surrounding at least a portion of the compressor section 42 and the heat addition or combustion section 44. A core cowl 140 surrounds the core engine 40. Still various embodiments may define the propulsion system 10 as an open rotor, propfan, or Brayton cycle machine.

The forward frame 12 connects the core engine 40 and the fan assembly 14 to the airframe 105. Particularly, the core cowl 140 is connected to the forward frame 12. In various embodiments, the forward frame 12 is a fan hub frame (FHF). In certain embodiments, a nacelle 16 surrounds the core engine 40 and core cowl 140 and is attached to the forward frame 12. In one embodiment, the propulsion system 10 is configured as an open rotor or unducted fan engine arrangement. In another embodiment, the nacelle 16, or portions thereof, surround a fan rotor assembly 18 of the fan assembly 14, or portions thereof, such as a turbofan engine configuration.

In various embodiments, the forward frame 12 generally includes a forward casing generally including bearing assemblies, dampers, and lubricant scavenge and supply conduits. The forward frame 12 may further encase or support one or more additional rotating fan stages or a booster. In various embodiments, the forward frame 12 is a fan hub frame, a compressor intermediate case, or other static structure surrounding at least a portion of the compressor section 42 or positioned at least partially forward of the compressor section.

The core engine 40 includes the turbine frame assembly 24 is positioned at the turbine section 46. In certain embodiments, the turbine frame assembly 24 is positioned between the high speed or first turbine 146 and the lower-speed or second turbine 246 (i.e., lower speed relative to the first turbine 146). The turbine frame assembly 24 may generally include a static casing including bearing assemblies, dampers, and lubricant scavenge and supply conduits. In various embodiments, the turbine frame assembly 24 defines a turbine center frame (TCF), a mid-turbine frame, or other static structure surrounding at least a portion of the turbine section 46. The turbine frame assembly 24 further includes a turbine casing 124 surrounding the second turbine 246 and connected to an aft frame assembly 22. The aft frame assembly 22 is positioned rearward along an axial direction of the turbine frame assembly 24 relative to a direction of flow of fluid across the aircraft 100. In various embodiments, the aft frame assembly 22 is a turbine rear frame (TRF) or nozzle assembly 50 of the propulsion system 10.

The airframe 105 is connected to the propulsion system 10 at the forward frame 12. In particular embodiments, the propulsion system 10 is connected to the airframe by way of a front engine mount link 32. In still certain embodiments, the propulsion system 10 is mounted generally and substantially in cantilevered arrangement from the airframe 105 by way of the front engine mount link 32.

In certain embodiments, the aft frame assembly 22 is selectively connected or selectively loaded to the airframe 105 by an aft engine mount link 34. The aft engine mount link 34 is extended between the aft frame assembly 22 and the airframe. The aft engine mount link 34 is selectively loaded by deflection of the core engine 40.

Referring to FIGS. 1-4, a nominal centerline axis 101 defines a reference centerline of the propulsion system 10 when attached to the airframe 105 in a static state condition (e.g., when the propulsion system 10 is not operating). An engine centerline axis 11 defines a reference centerline of the propulsion system 10 during operation of the propulsion system 10. Operation of the propulsion system 10 includes, but is not limited to, dry and wet motoring, ignition, idle, takeoff or maximum power, climb, cruise, approach, landing, and reverse thrust. During normal operation of the propulsion system 10 and aircraft 100, the propulsion system may deflect relative to the nominal position of the propulsion system. For instance, during non-operation or certain operating conditions, the nominal centerline axis 101 and the engine centerline axis 11 may be substantially coaxial or co-linear. However, during certain high loading conditions, such as following foreign object debris ingestion, bird strikes or ingestion, fan blade out, ice ingestion, or other adverse operating conditions, the propulsion system 10 may excessively deflect such that an angle 103 between the nominal centerline axis 101 and the engine centerline axis 11 reaches or exceeds an angle threshold. The angle threshold may generally define an angle at which the core engine 40 deflects relative to the nominal centerline axis 101 such that the core engine 40 contacts the airframe, such as surrounding casing.

To provide reduced bending of the core casing 240, a plurality of cowl mount links 300 selectively loads the core cowl 140 to the aft frame assembly 22 and the turbine frame assembly 24. The plurality of cowl mount links 300 is each loaded by deflection of the core engine 40. In various embodiments, the aft frame assembly 22 and the turbine frame assembly 24 each include respective cowl mount links 300 selectively connected to the core cowl 140. In certain embodiments, such as depicted in FIGS. 5-11, the plurality of cowl mount links 300 each include a plurality of members 310 extended toward the core cowl 140. The plurality of members 310 is configured to be selectively loaded by the plurality of cowl mount links 300. Additionally, or alternatively, the plurality of cowl mount links 300 selectively loading the core cowl 140 to the aft frame assembly 22 and the turbine frame assembly 24 mitigates adverse operating conditions related to rotor bow (e.g., at the first shaft 242, and/or the second shaft 244).

In certain embodiments, such as depicted in FIGS. 5-9, the plurality of cowl mount links 300 include a coupling 320 configured to selectively load to respective mount members 310. In various embodiments, the coupling 320 is positioned adjacent or next to respective mount members 310. In one embodiment, the coupling 320 at least partially surrounds a respective member of the plurality of mount members 310. The coupling 320 and the member 310 are unloaded relative to one another when the engine centerline axis 11 is substantially coaxial to the nominal centerline axis. The coupling 320 and the member 310 are loaded onto one another when the engine centerline axis 11 is deflected at the acute angle 103 (FIG. 3) relative to the nominal centerline axis 101 (FIG. 3).

Referring to FIGS. 5-6, the plurality of cowl mount links 300 may include a forward mount link 300a selectively loading the core cowl 140 to the turbine frame assembly 24 (FIG. 5) and an aft mount link 300b selectively loading the core cowl 140 to the aft frame assembly 22 (FIG. 6). It should be appreciated that embodiments further depicted and described in regard to FIGS. 7-11 may be applied as either the forward mount link 300a, the aft mount link 300b, or combinations thereof.

Referring back to FIGS. 5-6, the plurality of members 310 include a forward member 310a at the turbine frame assembly 24 and an aft member 310b positioned at the aft frame assembly 22. Respective forward and aft couplings 320a, 320b are positioned proximate to the respective forward and aft members 310a, 310b. In a certain embodiment, such as depicted in FIGS. 5-6, the respective couplings 320a, 320b surround the respective members 310a, 310b extended toward the respective couplings 320a, 320b. In various embodiments, the coupling 320 defines a fork extended circumferentially adjacent to the respective member 310.

Referring to FIGS. 7-9, the embodiments provided are configured substantially similar to the embodiments provided in regard to FIGS. 5-6. FIG. 8 is an axial side view of the view provided in FIG. 7. Furthermore, FIG. 8 is depicted at the forward mount link 300a depicted at FIG. 5. However, it should be appreciated that a similar arrangement may be applied at the aft mount link 300b depicted in FIG. 6. In FIGS. 7-8, the plurality of cowl mount links 300 include a joint member 315 connecting the respective coupling 320 at the core cowl 140 to the respective member 310. The coupling 320 may be positioned axially forward or aft of the respective member 310 and connected together via the joint member 315, such as depicted in FIG. 8. In FIG. 9, the coupling 320 may be positioned tangentially or circumferentially adjacent to the respective member 310. The embodiment depicted and described in regard to FIGS. 5-9 may particularly allow for distortion (e.g., ovalization, out-of-roundness, eccentricity relative to the centerline axis 11) of a turbine static structure 23 (e.g., the turbine frame assembly 24, the aft frame assembly 22). In various embodiments, the joint member 315 may provide loading along the axial, radial, and tangential directions.

Referring now to FIGS. 10-11, embodiments of the mount links 300 defining springs are provided. The embodiments provided in FIGS. 10-11 may be configured such as described in regard to FIGS. 1-9. FIG. 11 depicts the core cowl 140 at FIG. 10 in an open position. Additionally, the mount links 300 defining springs may be positioned at the forward cowl mount 300a, the aft cowl mount 300b, or combinations thereof with one or more embodiments depicted and described with regard to FIGS. 5-9. The mount links 300 may define leaf springs extended to and coupling the turbine static structure 23 (e.g., turbine frame assembly 24 or aft frame assembly 22 depicted in FIGS. 2-4). The mount links 300 include one or more portions extended at least partially tangentially and radially to the turbine static structure.

Referring still to FIGS. 10-11, a hinge 325 may be positioned at the core cowl 140 to allow the core cowl 140 to split into at least two portions 140a, 140b. The turbine static structure 23 may further include members 310 extended tangentially and radially toward the core cowl 140, such as to allow for hinged movement of the core cowl portions 140a, 140b. The mount links 300 defining springs may allow stiffness during bending of the turbine static structure. In various embodiments, the mount links 300 may be arranged axi-symmetrically or non-symmetrically circumferentially around the propulsion system 10.

Embodiments of the propulsion system 10 and aircraft 100 depicted and described herein may reduce undesired bending at the core casing 240. Reducing undesired bending at the core casing 240 may allow for modal closures for out of phase rotor bow (e.g., at the first shaft 242 or the second shaft 244). Reducing undesired being at the core casing 240 may improve engine operation during a bowed rotor start condition (i.e., during startup or operation of one or both shafts 242, 244 defining eccentricity relative to the engine centerline axis 11). Such improvements may reduce a period of time during windmilling or propulsion system motoring for attenuating rotor bow. Additionally, or alternatively, reduced undesired bending at the core casing 240 may reduce Alford forces, reduce risks associated with undesired rotor or blade rubbing against a surrounding casing, and improve propulsion system stability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A propulsion system for an aircraft including a core engine connected to a forward frame and a turbine frame assembly, and an aft frame assembly is connected by a turbine casing to the core engine aft of the turbine frame assembly. A core cowl surrounds the core engine, wherein the core cowl is connected to the forward frame. A plurality of cowl mount links selectively loads the core cowl to the aft frame assembly and the turbine frame assembly, wherein the plurality of cowl mount links is each loaded by deflection of the core engine.

2. The propulsion system of any clause herein, the aft frame assembly and the turbine frame assembly comprise a plurality of members extended along a radial direction toward the core cowl, wherein the plurality of members is configured to be selectively loaded by the plurality of cowl mount links.

3. The propulsion system of any clause herein, wherein the plurality of cowl mount links comprise a coupling configured to at least partially surround a respective member of the plurality of members, and wherein the coupling and the member are unloaded relative to one another when the engine centerline axis is substantially coaxial to the nominal centerline axis.

4. The propulsion system of any clause herein, wherein the coupling and the member are loaded onto one another when the engine centerline axis is deflected at the acute angle relative to the nominal centerline axis.

5. The propulsion system of any clause herein, wherein the plurality of cowl mount links comprise a coupling at least partially surrounding a respective member of the plurality of members, wherein the member is extended toward the core cowl, and wherein the coupling is extended toward the member, and wherein the coupling and the member are unloaded relative to one another when the engine centerline axis is substantially coaxial to the nominal centerline axis.

6. The propulsion system of any clause herein, wherein the aft frame assembly comprises a first member of the plurality of members extended along a radial direction toward the nacelle, and wherein a first mount link of the plurality of cowl mount links comprises a first coupling extended along the radial direction toward the core engine, and wherein the turbine casing comprises a second member of the plurality of members extended toward the core cowl, and wherein a second mount link of the plurality of cowl mount links comprises a second coupling extended along the radial direction toward the core engine.

7. The propulsion system of any clause herein, wherein at least a portion of the first coupling is positioned circumferentially adjacent to the respective first member.

8. The propulsion system of any clause herein, wherein at least a portion of the second coupling is positioned circumferentially adjacent to the respective second member.

9. The propulsion system of any clause herein, wherein the first coupling, the second coupling, or both, define a fork comprising a portion extended circumferentially adjacent to the respective first member or second member.

10. The propulsion system of any clause herein, wherein a joint member connects the respective mount link at the core cowl to the respective member.

11. The propulsion system of any clause herein, wherein a first joint member connects a first member of the plurality of members to a first coupling of the plurality of cowl mount links, and wherein a second joint member connects a second member of the plurality of members to a second coupling of the plurality of cowl mount links.

12. The propulsion system of any clause herein, wherein the plurality of cowl mount links is disposed in circumferential arrangement at the core cowl.

13. The propulsion system of any clause herein, wherein the plurality of cowl mount links comprise a first spring coupled to the core cowl and the aft frame assembly, and wherein the plurality of cowl mount links comprise a second spring coupled to the core cowl and the turbine frame assembly.

14. The propulsion system of any clause herein, the engine including a nacelle surrounding the core cowl, wherein the nacelle is connected to the forward frame.

15. The propulsion system of any clause herein, wherein the nacelle is connected to the core engine by an aft nacelle mount.

16. The propulsion system of any clause herein, wherein the aft nacelle mount connects the nacelle to the core engine at one or both of the turbine frame assembly or the aft frame assembly.

17. A gas turbine engine, the engine defining a nominal centerline axis, the propulsion system including a fan assembly comprising a forward frame; a core engine connected to the forward frame, wherein the core engine comprises a turbine frame assembly, and wherein the core engine defines an engine centerline axis, and further wherein the engine centerline axis is substantially coaxial to the nominal centerline axis during normal propulsion system operation, and wherein the engine centerline axis is at an acute angle to the nominal centerline axis when the core engine is deflected; an aft frame assembly, wherein the turbine frame assembly comprises a turbine casing at which the aft frame assembly is connected to the core engine aft of the turbine frame assembly, and wherein the aft frame comprises a nozzle assembly; a core cowl surrounding the core engine, wherein the core cowl is connected to the forward frame; and a plurality of cowl mount links selectively loading the core cowl to the aft frame assembly and the turbine frame assembly, wherein the plurality of cowl mount links is each loaded by deflection of the core engine.

18. The gas turbine engine of any clause herein, wherein the aft frame assembly and the turbine frame assembly each comprise a plurality of members extended toward the core cowl, and wherein the plurality of cowl mount links comprise a coupling, and wherein the plurality of members is configured to be selectively loaded by the plurality of cowl mount links, and further wherein the coupling and the member are unloaded relative to one another when the engine centerline axis is substantially coaxial to the nominal centerline axis, and wherein the coupling and the member are loaded onto one another when the engine centerline axis is deflected at the acute angle relative to the nominal centerline axis.

19. The gas turbine engine of any clause herein, wherein a joint member connects the respective mount link at the core cowl to the respective member.

20. The gas turbine engine of any clause herein, the engine including a nacelle surrounding the core cowl, wherein the nacelle is connected to the forward frame, and wherein the nacelle is connected to the core engine by an aft nacelle mount, and further wherein the aft nacelle mount connects the nacelle to the core engine at one or both of the turbine frame assembly or the aft frame assembly.

21. The gas turbine engine of any clause herein, comprising the propulsion system of any clause herein.

22. The propulsion system of any clause herein, comprising the gas turbine engine of any clause herein.

23. An aircraft comprising the gas turbine engine of any clause herein.

24. An aircraft comprising the propulsion system of any clause herein.

25. The aircraft of any clause herein, wherein the propulsion system or the gas turbine engine is coupled to a fuselage, a wing, or an empennage of the aircraft.

What is claimed is:
1. A propulsion system for an aircraft, the propulsion system defining a nominal centerline axis along an axial direction, the propulsion system comprising:
a fan assembly comprising a forward frame;

a core engine connected to the forward frame, wherein the core engine comprises a turbine frame assembly, and wherein the core engine defines an engine centerline axis, and further wherein the engine centerline axis is substantially coaxial to the nominal centerline axis during normal propulsion system operation, and wherein the engine centerline axis is at an acute angle to the nominal centerline axis when the core engine is deflected;

an aft turbine frame assembly connected by a turbine casing to the core engine aft of the turbine frame assembly;

a core cowl surrounding the core engine, wherein the core cowl is connected to the forward frame; and a plurality of cowl mount links selectively loading the core cowl to the aft turbine frame assembly and the turbine frame assembly, wherein the plurality of cowl mount links is each loaded by deflection of the core engine, wherein the plurality of cowl mount links comprise a first cowl mount link coupled to the core cowl and the aft turbine frame assembly, and wherein the plurality of cowl mount links comprise a second cowl mount link coupled to the core cowl and the turbine frame assembly, wherein the second cowl mount link is located forward of the first cowl mount link along the axial direction, wherein the aft turbine frame assembly and the turbine frame assembly each comprises a plurality of members extended along a radial direction toward the core cowl, wherein the plurality of members is configured to be selectively loaded by the plurality of cowl mount links, wherein the first cowl mount link selectively loads the core cowl to the aft turbine frame assembly, wherein the second cowl mount link selectively loads the core cowl to the turbine frame assembly, wherein the plurality of cowl mount links each comprises a coupling positioned axially forward or aft of a respective member of the plurality of members, the coupling having an arm extending radially inwardly from the core cowl and a fork attached to the arm and extending radially inwardly from the arm, the fork configured to at least partially surround the respective member, wherein a respective joint member of a plurality of joint members connects the coupling at the core cowl to the respective member, wherein the respective joint member is pivotably connected to the coupling via a first pivot point and the respective joint member is pivotably connected to the respective member of the plurality of members via a second pivot point.

2. The propulsion system of claim 1 wherein the turbine frame assembly comprises a turbine center frame casing, and wherein the aft turbine frame assembly comprises a turbine rear frame casing.

3. The propulsion system of claim 2, wherein the coupling and the respective member are unloaded relative to one another when the engine centerline axis is substantially coaxial to the nominal centerline axis.

4. The propulsion system of claim 3, wherein the coupling and the member are loaded onto one another when the engine centerline axis is deflected at the acute angle relative to the nominal centerline axis.

5. The propulsion system of claim 2, wherein the respective member is extended toward the core cowl, and wherein the coupling is extended toward the respective member, and wherein the coupling and the respective member are unloaded relative to one another when the engine centerline axis is substantially coaxial to the nominal centerline axis.

6. The propulsion system of claim 5, wherein the coupling comprises a first coupling and a second coupling, wherein the aft turbine frame assembly comprises a first member of the plurality of members extended along a radial direction toward a nacelle, and wherein the first cowl mount link of the plurality of cowl mount links comprises the first coupling extended along the radial direction toward the core engine, and wherein the turbine casing comprises a second member of the plurality of members extended toward the core cowl, and wherein the second cowl mount link of the plurality of cowl mount links comprises the second coupling extended along the radial direction toward the core engine.

7. The propulsion system of claim 6, wherein at least a portion of the first coupling is positioned circumferentially adjacent to the first member.

8. The propulsion system of claim 6, wherein at least a portion of the second coupling is positioned circumferentially adjacent to the second member.

9. The propulsion system of claim 6, wherein the fork includes a portion extended circumferentially adjacent to the respective first member or second member.

10. The propulsion system of claim 2, wherein a first joint member of the plurality of joint members connects a first member of the plurality of members to a first coupling of the plurality of cowl mount links, and wherein a second joint member of the plurality of joint members connects a second member of the plurality of members to a second coupling of the plurality of cowl mount links.

11. The propulsion system of claim 1, wherein the plurality of cowl mount links is disposed in circumferential arrangement at the core cowl.

12. The propulsion system of claim 1, comprising:
a nacelle surrounding the core cowl, wherein the nacelle is connected to the forward frame.

13. The propulsion system of claim 12, wherein the nacelle is connected to the core engine by an aft nacelle mount.

14. The propulsion system of claim 13, wherein the aft nacelle mount connects the nacelle to the core engine at one or both of the turbine frame assembly or the aft turbine frame assembly, and wherein the coupling is positioned circumferentially adjacent to the respective member of the plurality of members.

15. A gas turbine engine, the gas turbine engine defining a nominal centerline axis along an axial direction, the gas turbine engine comprising:
a fan assembly comprising a forward frame;
a core engine connected to the forward frame, wherein the core engine comprises a turbine frame assembly, and wherein the core engine defines an engine centerline axis, and further wherein the engine centerline axis is substantially coaxial to the nominal centerline axis during normal propulsion system operation, and wherein the engine centerline axis is at an acute angle to the nominal centerline axis when the core engine is deflected;
an aft turbine frame assembly, wherein the turbine frame assembly comprises a turbine center frame casing at which the aft turbine frame assembly is connected to the core engine aft of the turbine frame assembly, and wherein the aft turbine frame assembly comprises a turbine rear frame casing;
a core cowl surrounding the core engine, wherein the core cowl is connected to the forward frame; and
a plurality of cowl mount links selectively loading the core cowl to the aft turbine frame assembly and the turbine frame assembly, wherein the plurality of cowl mount links is each loaded by deflection of the core engine, wherein the plurality of cowl mount links comprise a first cowl mount link coupled to the core cowl and the aft turbine frame assembly, and wherein the plurality of cowl mount links comprise a second cowl mount link coupled to the core cowl and the turbine frame assembly, wherein the second cowl mount link is located forward of the first cowl mount link along the axial direction, wherein the aft turbine frame assembly and the turbine frame assembly each comprises a plurality of members extended along a radial direction toward the core cowl, and wherein the plurality of cowl mount links each comprises a coupling positioned axially forward or aft of a respective member of the plurality of members, the coupling having an arm extending radially inwardly from the core cowl and a fork attached to the arm and extending radially inwardly from the arm, the fork configured to at least partially surround the respective member, wherein a respective joint member of a plurality of joint members connects the coupling at the core cowl to a respective member of the plurality of members, wherein the respective joint member is pivotably connected to the coupling via a first pivot point and the respective joint member is pivotably connected to the respective member of the plurality of members via a second pivot point.

16. The gas turbine engine of claim 15, wherein the plurality of members is configured to be selectively loaded by the plurality of cowl mount links, and further wherein the coupling and the respective member are unloaded relative to one another when the engine centerline axis is substantially coaxial to the nominal centerline axis, and wherein the coupling and the respective member are loaded onto one another when the engine centerline axis is deflected at the acute angle relative to the nominal centerline axis.

17. The gas turbine engine of claim 16, comprising:
a nacelle surrounding the core cowl, wherein the nacelle is connected to the forward frame, and wherein the nacelle is connected to the core engine by an aft nacelle mount, and further wherein the aft nacelle mount connects the nacelle to the core engine at one or both of the turbine frame assembly or the aft turbine frame assembly, and wherein the coupling is positioned circumferentially adjacent to the respective member of the plurality of members.

18. The gas turbine engine of claim 15, wherein the respective member is extended toward the core cowl, the coupling is extended toward the respective member, and the coupling and the respective member are unloaded relative to one another when the engine centerline axis is substantially coaxial with the nominal centerline axis.

19. The gas turbine engine of claim 15, wherein a first joint member of the plurality of joint members connects a first member of the plurality of members to a first coupling of the plurality of cowl mount links, and a second joint member of the plurality of joint members connects a second member of the plurality of members to a second coupling of the plurality of cowl mount links.

* * * * *